US011513816B2

(12) United States Patent
Komarov et al.

(10) Patent No.: US 11,513,816 B2
(45) Date of Patent: Nov. 29, 2022

(54) SYSTEM CONFIGURATION CONTROL OF A HARDWARE SYSTEM

(71) Applicant: Bundesdruckerei GMBH, Berlin (DE)

(72) Inventors: Ilya Komarov, Berlin (DE); Manfred Paeschke, Wandlitz (DE); Olaf Dressel, Wustermark (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 416 days.

(21) Appl. No.: 16/630,666

(22) PCT Filed: Jul. 16, 2018

(86) PCT No.: PCT/EP2018/069275
§ 371 (c)(1),
(2) Date: Jan. 13, 2020

(87) PCT Pub. No.: WO2019/016140
PCT Pub. Date: Jan. 24, 2019

(65) Prior Publication Data
US 2021/0081216 A1    Mar. 18, 2021

(30) Foreign Application Priority Data
Jul. 21, 2017  (DE) .................... 10 2017 212 618.3

(51) Int. Cl.
*G06F 9/445* (2018.01)
*H04L 9/08* (2006.01)
(Continued)

(52) U.S. Cl.
CPC ........ *G06F 9/44505* (2013.01); *G06F 11/183* (2013.01); *H04L 9/0894* (2013.01);
(Continued)

(58) Field of Classification Search
None
See application file for complete search history.

(56) References Cited

U.S. PATENT DOCUMENTS 5,717,849 A   2/1998  Brady
8,356,091 B2  1/2013  Belz et al.
(Continued)

OTHER PUBLICATIONS

International Search Report PCT/ISA/210 for International Application No. PCT/EP2018/069275 dated Oct. 19, 2018.
(Continued)

*Primary Examiner* — William J. Goodchild
(74) *Attorney, Agent, or Firm* — Harness, Dickey & Pierce, P.L.C.

(57) ABSTRACT

The method includes creating and sending a change request for a change to the system configuration of the hardware system by means of a first hardware component of the plurality of hardware components, receiving the change request by means of the further hardware components of the plurality of hardware components, checking the change request by means of the further hardware components for compatibility of the change request with the configuration of the particular receiving hardware component by using configuration data of the receiving hardware component, in the case that the requested change to the system configuration is compatible with the configuration of the receiving hardware component, generating and sending an approval of the change to the system configuration by means of the receiving hardware component, and in the case that an approval quorum of the hardware components that is necessary for consent is achieved, entering the requested change to the system configuration of the hardware system into the block chain, implementing the requested change to the system configuration in the hardware system.

27 Claims, 4 Drawing Sheets

(51) Int. Cl.
*H04L 9/32* (2006.01)
*G06F 11/18* (2006.01)
*G06F 8/65* (2018.01)
*H04L 41/08* (2022.01)
*H04L 9/00* (2022.01)

(52) U.S. Cl.
CPC .......... *H04L 9/3239* (2013.01); *H04L 9/3247* (2013.01); *G06F 8/65* (2013.01); *H04L 9/50* (2022.05); *H04L 41/08* (2013.01)

(56) References Cited

U.S. PATENT DOCUMENTS

| | | | |
|---|---|---|---|
| 2001/0018736 | A1 | 8/2001 | Hashimoto et al. |
| 2004/0215948 | A1 | 10/2004 | Abbey et al. |
| 2009/0019275 | A1 | 1/2009 | Park et al. |
| 2020/0104293 | A1* | 4/2020 | Shi .................. G06F 16/2379 |
| 2020/0286049 | A1* | 9/2020 | Basu ................ G06Q 20/3827 |
| 2021/0224256 | A1* | 7/2021 | Manamohan ............ H04L 9/50 |

OTHER PUBLICATIONS

Written Opinion PCT/ISA/237 for International Application No. PCT/EP2018/069275 dated Oct. 19, 2018.

International Preliminary Report on Patentability for corresponding Application No. PCT/EP2018/069275 dated Jan. 30, 2020.
Aymen Boudguiga et al.,"Towards Better Availabilty and Accountability for IoT Updates by Means of a Blockchain," 2017 IEEE European Symposium on Security and Privacy Workshops (Euros &PW), IEEE, Apr. 26, 2017, pp. 50-58, XP033114038.
Ittai Abraham et al., "Solidus: An Incentive-compatible Crytocurrency Based on Permissionless Byzantine Consensus," Cornell University Library, Ithacha, NY, Dec. 9, 2016, XP080738035.
Alysson Bessani et al., "State Machine Replication for the Masses with BFT-Smart," 2014 44th Annual IEEE/IFIP International Conference on Dependable Systems and Networks, IEEE, Jun. 23, 2014, pp. 355-362, XP032647007.
Blockchain, *Wikipedia*, 2020, retrieved on the internet Mar. 27, 2020 at https://en.wikipedia.org/wiki/Blockchain .
A. M. Antonopoulos, Mastering Bitcoin—Chapter 7—The Blockchain O'Reilly Media, Inc., Dec. 2014, p. 116.
S. Nakamoto, 'Bitcoin: A Peer-to-Peer Electronic Cash System' Oct. 2008, pp. 1-9, retrieved from the internet Jul. 4, 2017 http://nakamotoinstitute.org/static/docs/bitcoin.pdf.
D. Schwartz et al., 'The Ripple Consensus Algorithm' *Ripple Labs Inc.*, 2014, https://ripple.com/files/ripples_consensus_whitepaper.pdf.

* cited by examiner

SYSTEM CONFIGURATION CONTROL OF A HARDWARE SYSTEM

CROSS-REFERENCE TO RELATED APPLICATIONS

This application is a national phase under 35 U.S.C. § 371 of PCT International Application No. PCT/EP2018/069275 which has an International filing date of Jul. 16, 2018, which claims priority to German Application No. 10 2017 212 618.3, filed Jul. 21, 2017, the entire contents of each of which are hereby incorporated by reference.

BACKGROUND

The invention relates to a method for controlling a system configuration of a hardware system and to a hardware system which is controllable by the method.

If a system configuration of a hardware system which comprises a plurality of individual hardware components which interact with one another is to be changed, it must be ensured that the change to be implemented to the system configuration is compatible with the provided hardware components and configurations thereof.

DESCRIPTION OF RELATED ART

US 2004/0215948 A1 describes a device, a program product and a method which use a non-volatile solid-state memory which is organised such that variable amounts of configuration data for a logically divided computer are stored in an efficient, compact and cost-effective manner. A non-volatile solid-state memory is divided into blocks of fixed size which are connected to one another to form chains for the purpose of storing variable amounts of configuration data for a plurality of logical units, for example logic partitions, hardware devices, networks and other resources. A chain of blocks of fixed size is used to look after configuration data for a given type of logical entity, wherein each block in a chain stores configuration data for a specific logical entity of the associated entity type. The blocks of fixed size comprise complete blocks and jointly used blocks, wherein complete blocks store data for an individual logical unit and jointly used blocks store data for a plurality of logical units of a common entity type.

US 2009/0019275 A1 describes a semiconductor storage system which contains an external memory, an internal memory, and a one-time programmable (OTP) memory. The external memory contains a kernel, a public key, first starting information used to authenticate the public key and to generate a secret key for test purposes, and a second bootloader, which checks the integrity of the kernel. The internal memory contains a first bootloader, which checks the integrity of the second bootloader and generates the secret key for test purposes. The OTP memory contains second starting information generated with use of the public key and a secret key. Since the secure starting method and the semiconductor memory system using this method, in contrast to conventional technology, do not require an additional OTP memory to store a secret key, the capacity and recording time of the OTP memory may be reduced by approximately half compared to the conventional technology.

U.S. Pat. No. 8,356,091 B2 describes a network element which comprises a controller for obtaining network information associated with an establishment of a network between a group of communication devices, and for providing the network information for a plurality of network setup devices, which are connected separately to the network element, wherein each of the network setup devices is connectable to a communication device from the group of communication devices in order to transfer at least part of the network information to the communication device, and wherein the network is set up at least in part on the basis of said at least part of the network information.

U.S. Pat. No. 5,717,849 A1 describes a software-controlled data processing system which uses control blocks, wherein each control block contains a data structure which defines at least one control parameter for a data-processing action. A plurality of control blocks are allocated to the data-processing action in order to enable its execution, and each of the plurality of control blocks has a marking value, which has an identical value for each set of chained control blocks associated with the data-processing action. The data processing method comprises the following steps: executing the data-processing action by accessing each of the plurality of allocated control blocks in order; comparing marking values which are contained in sequentially accessed control blocks in order to determine whether the marking values are identical, and, if so, continuing the execution of the data-processing action, and, if not, reporting an anomaly.

US 2001/0018736 A1 describes a microprocessor which is protected against manipulation and which, in a multi-task environment, stores context information for a program whose execution is to be interrupted, wherein the context information contains information indicating a state of execution of this program and the execution code encryption key of this program. Execution of this program may be restarted by restoring the state of execution of this program on the basis of the stored context information. The context information may be encrypted with use of the public key of the microprocessor and then decrypted with use of the secret key of the microprocessor.

SUMMARY

The object of the invention was therefore to create a method for controlling a system configuration of a hardware system.

The problem addressed by the invention is solved by the features of the independent claims. Embodiments of the invention are described in the dependent claims.

Embodiments comprise a method for controlling a system configuration of a hardware system by using a block chain associated with the hardware system. The block chain comprises entries containing configuration data of the hardware system. The hardware system comprises a plurality of hardware components, wherein each of the hardware components comprises at least one processor, a memory containing configuration data of the various hardware components, and a communication interface for communicating with one or more of the hardware components of the hardware system.

The method comprises:

creating and sending a first change request for a first change to the system configuration of the hardware system by means of a first hardware component of the plurality of hardware components, receiving the first change request by means of the further hardware components of the plurality of hardware components, checking the first change request by means of the further hardware components for compatibility of the change request with the configuration of the particular receiving hardware component by using configuration data of the receiving hardware component, in the case that the requested first change to the system configuration is compatible with the configuration of the receiving hardware component, generating and sending an approval of the first change to the system configuration by means of the receiving hardware component, and in the case that an approval quorum of the hardware components of the plurality of hardware components that is necessary for consent is achieved:

entering the requested first change to the system configuration of the hardware system in the block chain, implementing the requested first change to the system configuration in the hardware system.

BRIEF DESCRIPTION OF THE DRAWINGS

Embodiments of the invention will be explained in greater detail hereinafter with reference to the drawings, in which.

DETAILED DESCRIPTION

Figure 1:
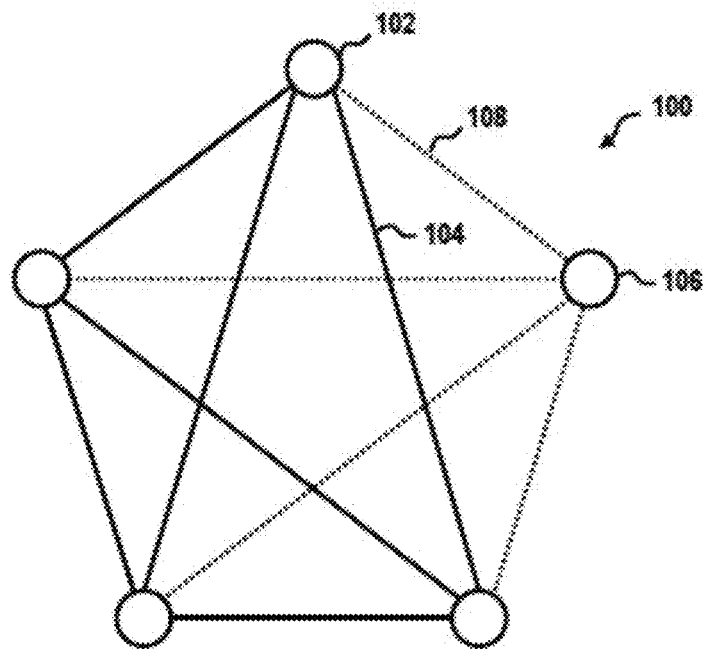
FIG. 1 shows a block diagram of an embodiment of an exemplary hardware system.

Here, a hardware system is understood to mean an arrangement which comprises a plurality of hardware components, wherein each of the hardware components has a processor and a memory containing configuration data. The hardware component may also comprise program instructions in the form of software, firmware and/or hardware, which for example is configured to be executed by the processor of the hardware component. According to some embodiments the memory for example comprises corresponding program instructions. The hardware components furthermore each comprise a communication interface and are connected to one another for communication via this communication interface. The communication connections may form a communication network with the hardware components as network nodes. The communication between the hardware components, in some embodiments, may be performed in cryptographically secured form. For example, the communication may be encrypted, for example by means of an asymmetric, symmetric, or hybrid encryption method. For example, the communication may occur via a communication link secured by means of end-to-end encryption. Furthermore, the communication or at least parts thereof may be signed by the relevant sender, so as to prove the authenticity of the communication. To this end, a MAC algorithm may be used, for example.

Here, a configuration of a hardware component is understood to mean the totality of software-, firmware- and/or hardware-based features, basic settings and/or adaptations of the corresponding hardware component. The configuration of a hardware component in particular comprises adaptations of programs or hardware parts of the corresponding hardware component at the hardware system, i.e. at the further hardware components comprised by the system and also the interaction with these during an execution of intended functions by the corresponding hardware component. Besides the installation, i.e. the initial settings, the configuration may also comprise further selectable pre-sets or default settings of the operating parameters of the hardware component.

A hardware configuration is understood to mean hardware-based features of the hardware component, i.e. a certain compilation of hardware parts, such as processor and/or memory, comprised by the corresponding hardware component. A hardware configuration thus comprises, for example, a processor type, a memory type and/or interface definitions.

A corresponding hardware component, for example, may be configured on the software side such that it communicates and/or interacts with one or more further hardware components of the hardware system in that one or more drivers for the further hardware components are installed. Here, drivers designate program instructions which control the communication and/or the interaction of other hardware components of the hardware system. According to some embodiments, the driver on the one hand communicates directly with one or more of the other hardware components and exchanges control signals and/or data therewith. The communication occurs via an interface, for example a communication bus, i.e. a hardware interface, or a basic communication system of an operating system of the hardware component comprising the driver. On the other hand, the driver provides an operating system and/or application software of the corresponding hardware component with a fixed interface. In particular, a driver may enable standardised communication with different kinds of hardware components.

The configurations of the hardware components also comprise software-based configurations, for example. These configurations for example comprise basic configurations, i.e. default settings or pre-sets, which form the basis of the general operation of the corresponding hardware components. Furthermore, a configuration may comprise adaptations which contribute to adapting the corresponding hardware component for example to the hardware system and in particular to the interaction with the further hardware components of the system. Here, the basic settings may be used for example as fail-safe configurations.

The configuration data of a hardware component are stored for example in a configuration file thereof comprising specific software-, firmware- and/or hardware-based settings of the hardware component.

The system configuration for example comprises all software-, firmware- and/or hardware-based settings of the hardware system. The system configuration is stored in a configuration file in the form of a block chain or with the block chain structure. This configuration file is configured not only to store the current system configuration, but also to record all changes to the system configuration. The corresponding block chain is for example stored in the memories of a plurality and/or all of the hardware components of the hardware system.

In particular, the system configuration may comprise information as to which hardware components are comprised by the system, which functions the individual hardware components comprise or provide for other hardware components, and the way in which the hardware components of the system communicate or interact with one another. For example, the system configuration comprises the configurations of all hardware components comprised by the hardware system. For example, the system configuration, for each of the hardware components, comprises all settings or features of the corresponding hardware components which are relevant and/or necessary for the functionality or for at least one function of at least one further hardware component of the system.

If the system configuration of the hardware system is to be changed, for example if a new service which at least one of the hardware components wishes to offer is to be implemented, a corresponding request is generated by the component wishing to offer the service and is presented to the other components for voting. This may be implemented directly by the requesting component or successively by forwarding the request between the components, for example in the case of a peer-to-peer network.

A corresponding change for example may comprise an addition of an additional hardware component, such as a router, to the hardware system. Furthermore, a corresponding change may be an adjustment of a communication protocol or a language, for example a recording language. Here, a recording language relates to a machine-readable language for organising and formatting texts and other data, for example the Hypertext Markup Language (HTML). For example, a corresponding change may comprise an adjustment from HTML4 to HTML5. Furthermore, a corresponding change may comprise an additional service provided by an additional hardware component.

The components which receive the request each check the content of the request, i.e. the new service, for its compatibility with their own particular configuration. Components whose configuration is compatible with the proposed change to the system configuration approve the implementation; incompatible components reject it. In accordance with some embodiments the rejection is issued explicitly by the sending of a rejection notification. In accordance with further embodiments the rejection is issued implicitly in that the rejecting hardware component does not reply to the request. If, on the whole, a consensus is found between the components of the hardware system, or at least between the components of a plurality of components eligible to vote, that the new service is at least sufficiently compatible, a corresponding entry is generated in the block chain, and the service is implemented.

A proposed or requested change to the system configuration is for example compatible with the configuration of a checking hardware component if the functionality or the functional scope of the checking hardware component will not be adversely influenced and/or reduced as a result of the change to the system configuration. This may be the case for example if an existing service is to be updated by an improved service. If the checking hardware component is not configured to use the existing service, the update to the improved service thus influences neither the functionality nor the functional scope of the checking hardware component, and in particular these are not adversely influenced. Consequently, the update is considered to be compatible in accordance with some embodiments. Furthermore, a change may be compatible if an additional or improved service, for which the hardware component is configured for use, is implemented as a result of the change. If the checking hardware component in the case of the aforementioned example is configured to use the existing service, the update is compatible if the checking hardware component is also configured for use of the updated service.

Some embodiments may have the advantage that the hardware system may check the compatibility of a change to the system configuration and may control the implementation of this change independently, without a central control unit. Furthermore, the use of the block chain offers a possibility for forgery-proof logging of the changes made.

At the same time, the block chain and its voting mechanism for consensus building provide an efficient method for ensuring that a change is also actually implemented only if there is a consensus between the hardware components by way of the compatibility of this change with the individual configurations of the components.

For example, the hardware components may be "smart devices". Smart devices are everyday objects which are provided with information technology systems and are configured to process information themselves. These smart devices are equipped with data-processing hardware, such as a built-in microcontroller, communication interfaces and/or sensors, so that they acquire and store data and/or may exchange data with one another. The catchword for this development is for example what is known as the "Internet of Things" (also IoT for short).

Here and hereinafter, a "processor" is understood to mean a logic circuit which is used to execute program instructions. The logic circuit may be implemented on one or more discrete components, in particular on a chip. In particular, a "processor" is understood to be a microprocessor or a microprocessor system formed of a number of processor cores and/or a plurality of microprocessors.

A "memory" is understood here to mean both volatile and non-volatile electronic memories or digital storage media.

A "non-volatile memory" is understood here to mean an electronic memory for permanently storing data. A non-volatile memory may be configured as a non-changeable memory, which is also referred to as a read-only memory (ROM), or as a changeable memory, which is also referred to as a non-volatile memory (NVM). In particular, it may be an EEPROM, for example a flash EEPROM, referred to as a flash for short. A non-volatile memory is characterised in that the data stored on it are retained even once the power supply has been switched off.

A "volatile electronic memory" is understood here to mean a memory for storing predominantly data, which memory is characterised in that all data are lost once the power supply has been switched off. In particular, the memory may be a volatile direct access memory, which is also referred to as a random-access memory (RAM), or may be a volatile main memory of the processor.

A "protected memory area" is understood here to mean an area of electronic memory to which access, that is to say read access or write access, is possible only via a processor of the hardware component. In accordance with some embodiments, access from the processor coupled to the memory is possible only if a condition necessary for this is satisfied. This may be, for example, a cryptographic condition, in particular a successful authentication and/or a successful authorisation check.

An "interface" or "communication interface" is understood here to mean an interface via which data may be received and sent, wherein the communication interface may be of contact-based or contactless configuration. The communication interface may be an internal interface or an external interface, which for example is connected to an associated device by means of a cable or wirelessly. A communication interface for wireless communication is a communication interface which is configured to send and receive data contactlessly. The communication may be implemented for example in accordance with an RFID and/or NFC standard, such as Bluetooth. Furthermore, the communication interface may be configured for communication via a local wireless network, for example in accordance with a standard from the IEEE-802.11 family and/or WiFi.

Communication may be implemented for example via a network. A "network" is understood here to mean a transmission medium with a connection for communication, in particular a local connection between the ID provider computer system and the computer system and/or the sensor devices or a local network, in particular a local area network (LAN), a private network, in particular an intranet, and a virtual private network (VPN). For example, the ID provider computer system, similarly to the computer system and/or sensor devices, may comprise a standard wireless interface for connection to a WLAN, to which the ID provider computer system and/or the computer system and/or sensor devices may be connected in order to produce a local connection for the transmission of the authentication token. The network may also be a public network, for example the Internet.

A service is for example a specialist grouping of functions in an electronic component, i.e. one of the hardware components. The hardware component for example forms an electronic, self-sufficient unit, which groups associated functions and makes these available via a defined interface. A service may be software-based and/or hardware-based. Examples of services include web services, network services, system services or telecommunication services.

A service of a hardware component makes a function available for other hardware components of the hardware system via a network connecting the hardware components of the hardware system. For example, a service enables a machine-to-machine communication of the hardware components via the network on the basis of a communication protocol. For example, data are exchanged and retrieved on remote hardware components via the network functions. These functions may be hardware and/or software functions. Each service has for example a uniform resource identifier (URI), via which the service is uniquely identifiable, as well as an interface description in machine-readable format, which defines how interaction with the service is to be implemented.

For example, one of the hardware components comprises a program which sends a request to a service made available by another hardware component. The requested service for example sends back requested data in response to the request and/or executes a requested function. Services provided by the hardware components comprise for example an automated data exchange or a retrieval of functions on other hardware components of the hardware system and/or remote computer systems which are not part of the hardware system.

For example, one of the hardware components provides a description of the relevant service. For example, the description is provided in a directory which may be accessed and searched by other hardware components wishing to utilize the service and/or seeking a corresponding service. For example, a required service may be searched for on the basis of the directory. Furthermore, details regarding preconditions and/or method steps necessary for the request for the corresponding service may be deduced from the description. In accordance with some embodiments, protocol details are also exchanged between the hardware component providing a service and the hardware component seeking to utilize the service.

In order to provide a service, a hardware component may comprise a service program. A service program may be for example a computer program which performs general, in particular system-related tasks.

A "program" or "program instructions" shall be understood here, without limitation, to mean any type of computer program which comprises machine-readable instructions for controlling a functioning of the computer.

A "block chain" will be understood here and hereinafter to mean an organised data structure, wherein each block of the block chain is identified by a hash value and references a previous block in the block chain; for examples of a block chain see https://en.wikipedia.org/wiki/Block_chain_(database) and "Mastering Bitcoin", Chapter 7, The Blockchain, pages 161 ff. An embodiment of a block chain was described in the year 2008 in a white paper under the pseudonym Satoshi Nakamoto in relation to Bitcoin ("Bitcoin: Peer-to-Peer Electronic Cash Systems" (https://bitcoin.org/bitcoin.pdf)). The block chain consists of a series of data blocks, in each of which one or more entries or transactions are collected and are provided with a checksum in the form of a hash value. New blocks of the block chain are generated in a usually CPU-intensive process, which is also referred to as "mining". These newly generated blocks are then added to the block chain and spread via a network to all subscribers, or nodes of the network. In accordance with alternative embodiments the CPU-intensive mining process may also be replaced by an alternative process for block generation on the basis of a consensus with the new block. The entries of the data blocks may comprise data that are to be stored, for example.

Some embodiments may have the advantage that the block chain offers a high level of security against subsequent manipulations, due to the storage of cryptographic checksums, i.e. hash values, of the previous block in the subsequent block. In a block chain the entries or transactions of a block are hashed with one another in pairs for example by a Merkle tree, and only the last hash value of the block obtained in this way, what is known as the root hash value, is noted as checksum for example in a header of the block. The blocks may then be chained with use of these root hash values. Each block of the block chain may contain, in its header, the hash of the entire previous block header. The order of the blocks is thus defined unambiguously, and a chain structure is created. Due to the chaining of the individual blocks to one another implemented in this way, a subsequent modification of the previous blocks or of individual previous blocks and of transactions secured via the robot hash value is practically ruled out, since for this purpose the hash values of all subsequent blocks would likewise have to be recalculated within a short space of time.

A consensus may also be implemented in another way in a block chain. For example, a consensus may be achieved by being voted by way of an incorporation of proposed entries into the block chain. For example, all subscribers vote on a proposed entry for the block chain. If a necessary approval quorum is achieved, i.e. a sufficient number of the subscribers agree, the proposed entry is included in the block chain. For example, an additional block of the block chain which is added to the block chain comprises the corresponding entry.

An approval quorum shall be understood here to mean a necessary number of approvals of the hardware components which must be achieved so that a proposed change is accepted or confirmed by the hardware system, i.e. a consensus is achieved to accept or to confirm the proposed change.

In accordance with one embodiment each subscriber manages a unique list of other subscribers which it trusts as a group. Each subscriber may propose new entries which are to be included in a new block of the block chain. A vote is taken with regard to the incorporation and thus acknowledgement of the validity of the proposed entries. For example, each subscriber thus votes only on those proposals that originate from subscribers within its list. In other words, for the decision as to whether a proposal for a new entry is acknowledged as valid, i.e. whether there is a consensus between the subscribers in respect of the validity of this entry, only the votes of those subscribers included by the list of the subscriber making the relevant proposal are taken into consideration. In order for a proposal for an entry to be deemed valid, a certain minimum proportion of subscribers eligible to vote must vote yes, for example 80%. All proposed entries that satisfy this criterion are included in the block chain. Such a vote may comprise a plurality of roundings. All other proposals that do not satisfy the aforementioned criterion are rejected or resubmitted for voting when the next block of the block chain votes. The aforementioned lists constitute sub-groups of the block chain network that are trusted on the whole as a group by the subscriber managing the relevant list, without said subscriber having to trust every individual subscriber in the list. An example of such a consensus method is offered by the ripple protocol consensus algorithm (David Schwartz et al.: "The Ripple Protocol Consensus Algorithm", Ripple Labs Inc., 2014, https://ripple.com/files/ripple_consensus_whitepaper.pdf).

A "program module" here denotes an independent program which is stored in a block chain. The program module may be configured to control the creation in the block chain of entries associated with the program module. If the program module is executed, a vote of all subscribers eligible to vote is thus taken for example automatically, and the result of the vote is assessed. The program module may be stored in a block of the block chain or distributed over a plurality of blocks. For example, a program module may be a "smart contract", as may be implemented for example in the Open Source Ethereum Blockchain.

Data may be secured cryptographically for example by encryption with an asymmetric key pair, i.e. a private or preferably a public cryptographic key, or a symmetric cryptographic key. A cryptographic protection may be, additionally or alternatively, a signature by a signature key, for example a private cryptographic key of an asymmetric key pair. A cryptographic protection of data transmissions may be advantageous in particular in the case of contactless, for example wireless, data transmissions, since the transmitted signals in this case may be intercepted more easily than in the case of a contact-based, for example wired, data transmission.

For example, a cryptographically protected transmission of data may comprise a transmission via an encrypted end-to-end connection. An "encrypted" end-to-end connection" or an "encrypted end-to-end transmission channel" shall be understood here to mean a connection between a sender and a receiver with an end-to-end encryption, in which data to be transmitted are encrypted by the sender and are only decrypted again by the receiver. Transmitted data are thus encrypted over all transmission stations, so that, on account of the encryption, intermediate stations may not become aware of the content of the transmitted data. The connection is cryptographically secured by the encryption in order to prevent an exposure and/or a manipulation of the transmission, wherein to this end a "secure-messaging" method may be used. An end-to-end encryption is based for example on two symmetric cryptographic keys, wherein a first of the symmetric keys is used to encrypt messages and a second of the symmetric keys is used to authenticate the sender of the message.

The key for authenticating the sender of the message may be used for example to create a message authentication code (MAC). Certainty of the origin of the messages may be obtained, and the integrity thereof verified by means of a MAC. MAC algorithms require two input parameters, firstly the data to be protected and secondly a secret key. A message authentication code is calculated in the form of a checksum from these two input parameters. The sender of a message calculates a MAC for the date of the message to be transmitted and sends the message together with the MAC to the receiver. The receiver calculates the MAC for the received message with its key and compares the calculated MAC with the received MAC. If they match, it is concluded that the message was sent by a party having access to the secret key and that the message was not changed during the transmission.

A "certificate" is understood here to be a digital certificate which is also referred to as a public key certificate. What is known as a public key infrastructure (PKI) is realised by such certificates based on asymmetric key pairs. Such a certificate is constituted by structured data used to associate a public key of an asymmetric crypto system with an identity, for example of a person or a device. A certificate for example may include and be signed with a public key. Alternatively, certificates based on zero-knowledge crypto systems are also possible. For example, the certificate may correspond to standard X.509 or another standard. For example, the certificate is a CV certificate or also a card verifiable certificate (CVC). An implementation of such CVCs is specified for example in ISO/IEC 7816-8.

The PKI provides a system for issuing, distributing and checking digital certificates. A digital certificate is used in an asymmetric crypto system to confirm the authenticity of a public key and its admissible field of application and validity. The digital certificate is itself protected by a digital signature, the authenticity of which may be checked using the public key of the issuer of the certificate. In order to check the authenticity of the issuer key, a digital certificate is again used. A chain of digital certificates may thus be constructed, with each of the certificates confirming the authenticity of the public key by which the previous certificate may be checked. Such a chain of certificates forms what is known as a validation path or certification path. The subscribers of the PKI must be able to rely on the authenticity of the last certificate, or what is known as the "root certificate", and of the key certified by this certificate, without a further certificate. The root certificate is managed by what is known as a root certification authority, whose authenticity, presupposed to be protected, forms the basis of the authenticity of all certificates of the PKI.

When protecting electronic communication by asymmetric cryptographic methods, digital certificates are a tried and tested means for demonstrating authorisations. Certificates are structured data that document the authenticity and/or further properties/authorisations of the owner of a public key (signature verification key) and, by way of an independent, credible authority (certification service provider (CSP)), generally confirm the certification body allocating the certificate. Certificates are generally provided to a broad group of people in order to enable this group to check the authenticity and validity of electronic signatures.

A certificate may be associated with an electronic signature if the private key belonging to the public key has been used for generation of the electronic signature to be checked. Since a CSP generally provides a certificate in association with a public key, a CSP allows the users of asymmetric crypto systems to associate the public key with an identity, for example of a person, an organisation, an energy system, or computer system.

Asymmetric key pairs are used for a large number of crypto systems and also play an important role in the signing of electronic documents. An asymmetric key pair consists of a public key, which is used for encryption and/or decryption of data and may be forwarded to third parties, for example to a service provider and/or a CSP, and of a private key, which is used for encryption and/or decryption of data and generally has to be kept secret. The public key allows anybody to encrypt data for the owner of the private key, to check digital signatures of his/her documents, or to authenticate him/her. A private key enables its owner to decrypt data encrypted with the public key or to create digital signatures for electronic documents. A signature created with a private key may be verified using the associated public key.

Digital signatures are used for secure electronic data exchange, for example on the Internet on an intranet, and make it possible to check identities and/or authorisations and the authenticity of the exchanged data. In order to ensure this, a public key infrastructure is generally necessary, which confirms the validity of the used keys by way of certificates.

The creation of a digital signature, referred to hereinafter also merely as a "signature", is a cryptographic process in which any data, for example an electronic document or a further data value referred to as a "signature", is calculated. The signature for example may be an encrypted hash value of the electronic document, in particular a hash value encrypted with a private key of a cryptographic key pair associated with a certificate. The particular feature of such of a signature lies in the fact that its authorship and affiliation to a specific person or authority may be checked by any third parties.

In accordance with some embodiments the hardware system, in addition to the plurality of hardware components, also comprises further hardware components, whose approval is not relevant for the approval quorum necessary for the consensus. In accordance with some embodiments the change request is not submitted to the corresponding further hardware components. In accordance with some embodiments the further hardware components are not configured to receive and/or check the change request.

In accordance with some embodiments the approval quorum necessary for a consensus requires the number of approvals of the hardware components of the plurality of hardware components to exceed a predefined threshold value. Some embodiments may have the advantage that it may thus be ensured that within the system configuration a sufficient number of hardware components are also compatible with the change and may make use of the implemented change to the system configuration, and are not impaired in respect of their functioning as a result of said change.

In accordance with some embodiments the threshold value is dependent on the type of requested first change to the system configuration. Some embodiments may have the advantage that, in the event of changes which have no far-reaching consequences for the functionality of the hardware system, a lower threshold value may be set than for changes that have far-reaching consequences. If, for example, security-relevant functions of the system, such as an encryption algorithm, are affected by the change, the threshold value is thus set high. For example, the approval of all hardware components is necessary. If, by contrast, the change for example improves an optional service, for example the display of a user interface, the threshold value may thus be set lower. At the same time, it may be ruled out that there is a risk of sustainably influencing the functionality of the system.

In accordance with some embodiments a classification system for classifying requests is specified, for example. Each request is classified in accordance with the classification system, wherein each class of the classification system is associated with one or more criteria, such as a threshold value of an approval quorum necessary for a consensus. On the basis of the classification it may thus be determined what threshold value must be satisfied. The classification is performed for example in each case by the hardware components receiving the request.

In accordance with some embodiments each of the individual hardware components is assigned a weighting factor, and the number of approvals of the hardware components is determined as weighted sum under consideration of the weighting factors of the approving hardware components. Some embodiments may have the advantage that differences in the approving hardware components may thus be taken to consideration. For example, a change to the system configuration that is to be implemented may be of great significance for the functionality of the hardware system. For example, an update will be implemented, by means of which a serious security gap is closed. The weighting factors may be associated with the individual hardware components for example depending on their particular significance for the functionality of the hardware system. As a result of the consideration of the weighting factors, it may be ensured that the change is implemented only when at least all hardware components decisive for the functionality of the hardware system are compatible with it and have approved the change. If the functionality of hardware components that are of secondary importance for the functionality of the hardware system will initially be adversely affected as a result of the change, this may thus be remedied subsequently by a further update. The problematic security gap may thus be closed promptly, however, and at the same time at least the fundamental functionality of the hardware system may thus be maintained.

In accordance with some embodiments the plurality of hardware components comprise at least one hardware component whose approval is obligatory for the entering of the requested first change of the system configuration of the hardware system in the block chain. The approval quorum that is necessary for a consensus also requires approval of the at least one obligatory hardware component. Some embodiments may have the advantage that the obligatory hardware component is for example a hardware component that is essential for the functionality of the hardware system and whose compatibility with the requested change to the system configuration must be ensured. Due to the precondition that the approval of the corresponding hardware component is obligatory for the consensus or for the approval quorum that is necessary for the consensus, it may thus be ensured that the functionality of the hardware system is retained following implementation of the requested change to the system configuration. This then ensures the functionality of the hardware system in particular also if the approval quorum that is necessary for a consensus does not require approval of all hardware components of the plurality of hardware components.

In accordance with some embodiments the plurality of hardware components comprise a number of hardware components whose approval is obligatory for the entering of the requested first change of the system configuration of the hardware system into the block chain, whereas the approval quorum that is necessary for a consensus requires an approval of the number of obligatory hardware components.

In accordance with some embodiments the plurality of hardware components comprises a plurality of sub-groups, wherein the approval quorum that is necessary for a consensus requires that a sub-group-individual approval quorum is achieved for each of the sub-groups. For example, the hardware components may be divided into sub-groups in accordance with their type. Some embodiments may have the advantage that security-relevant hardware components and/or hardware components essential for the functionality of the hardware system may be allocated to sub-groups for which a higher sub-group-individual approval quorum is necessary than for a sub-group comprising hardware components which are neither relevant to security nor essential for the functionality of the hardware system. For example, a sub-group-individual approval quorum of a first sub-group may require approvals of all hardware components of the first sub-group, whereas a sub-group-individual approval quorum of a second sub-group might not require approval of all hardware components of the second sub-group, but merely approvals of some of the corresponding hardware components.

In accordance with some embodiments the approval quorum that is necessary for a consensus does not require the approval of all hardware components of the plurality of hardware components. Some embodiments may have the advantage that an approval of all hardware components does not necessarily have to be provided. For example, for the necessary approval quorum it may be sufficient for an adequate number of hardware components of the plurality of hardware components to be in approval. Should there be no approvals by one or more hardware components, for example because the corresponding hardware components have functional disruptions and/or have failed, the change to the system configuration may still be implemented for the remaining hardware components functioning correctly. For example, the protection of the hardware system against manipulation may thus be increased. Even if a hacker were able to take over one or more hardware components and manipulate them such that they were to deny their approval for a compatible change to the system configuration, the hacker would thus still be unable to prevent the consensus and thus the implementation of the change. Provided a number of approvals sufficient for the necessary approval quorum is achieved, a consensus is provided, and the change to the system configuration is implemented as a result of the entering in the block chain. On the other hand, it may be ensured by selection of a suitable threshold value for the number of approvals necessary for the approval quorum of less than 100%, but for example greater than 50%, for example at least 51%, at least 60%, at least 70%, at least 75%, at least 80% and/or at least 90%, that the hacker additionally may be effectively prevented from enforcing the necessary approval quorum for implementation of a change to the system configurations not compatible with the configurations of the hardware components, in particular with the security configurations thereof.

In accordance with some embodiments the approval quorum necessary for a consensus requires an approval of all hardware components of the plurality of hardware components. Some embodiments may have the advantage that it may be ensured that all hardware components are compatible with the requested change to the system configuration. If the corresponding change is then implemented, it may thus be ruled out that this will bring about any functional disruptions to the hardware system as a result of the implementation.

In accordance with some embodiments the memories of the hardware components each comprise a protected memory area, in which a private cryptographic key of an asymmetric key pair associated with the particular hardware component is stored.

The method also comprises: signing the individual approvals by the particular generating hardware component with use of the private cryptographic key stored in the protected memory area of the generating hardware component.

Some embodiments may have the advantage that, by way of the signing of the approvals with the private keys of the hardware components, the authenticity of the particular approval may be proven. In accordance with some embodiments the entry of the change to the system configuration in the block chain comprises the signatures of the approvals of the hardware components that contributed to the consensus.

In accordance with one embodiment the block chain is used to document approvals of the hardware components to requested changes to the system configuration of the hardware system. Some embodiments may have the advantage that, by way of this documentation or logging of all hardware components, in particular of hardware components added subsequently to the hardware system, it may be comprehended which changes have been adopted and how the resultant system configuration looks.

In accordance with some embodiments all hardware components are configured to sign their approvals, i.e. they comprise a private cryptographic key usable as signature key in a protected memory area of their memory. In accordance with further embodiments not all hardware components comprise such a key, i.e. only some of the hardware components of the plurality of hardware components are configured to sign their particular approval. This is thus also used to monitor or control the implementation of the change to the system configuration.

In accordance with some embodiments the entering of the requested first change in the block chain is a necessary precondition for the implementation of the requested first change to the system configuration in the hardware system. Some embodiments may have the advantage that the change is implemented only if all hardware components of the plurality of hardware components or at least the hardware components of the plurality of hardware components necessary for this purpose have actually checked the requested change for compatibility and have explicitly approved it.

In accordance with some embodiments the requested first change to the system configuration is entered in the block chain by the requesting first hardware component. Some embodiments may have the advantage that the block chain is managed by the hardware components themselves of the plurality of hardware components. In accordance with some embodiments each of the corresponding hardware components is configured to request a change to the system configuration and, if an approval quorum that is necessary for a consensus is achieved, to enter the change in the block chain.

In accordance with some embodiments the block chain comprises a program module for controlling the entering of the change to the system configuration. In order to enter the change, the entering hardware component executes the program module. In accordance with some embodiments the program module checks, as a precondition for the entering, whether a consensus regarding the entering has been achieved between the hardware components of the plurality of hardware components. In accordance with some embodiments, the program module has access to the public cryptographic keys which are assigned to the private cryptographic keys of the hardware components used as signature keys. In accordance with some embodiments the public cryptographic keys which are used as signature verification keys are stored in the block chain.

If the change to the system configuration comprises the incorporation of a new hardware component into the hardware system, the entering of the change in accordance with some embodiments thus also comprises the public key of the additionally incorporated hardware component.

In accordance with some embodiments the requested first change to the system configuration is entered in the block chain by a hardware component of the plurality of hardware components selected for entry of changes to the system configuration in the block chain. Some embodiments may have the advantage that only hardware components of the plurality of hardware components that are protected physically and/or cryptographically against unauthorised access and manipulation are configured for the entry of changes in the block chain. For example, corresponding hardware components comprise a security module, by which they are protected against manipulation. Existing entries in the block chain may thus be prevented from being manipulated or supplemented in unauthorised fashion by inclusion of a hardware component configured for entering changes.

A "security module" provides cryptographic core routines in the form of cryptographic program instructions with cryptographic algorithms for signature creation and verification, key generation, key negotiation, encryption and decryption of data and/or random number generation may also be used as a secure memory for cryptographic keys.

For example, at least parts of the security module are signed. Before the security module is used, it is checked whether the signature or the signatures are valid. If one of the signatures is not valid, use of the security module and/or of the hardware component secured by the security module is blocked.

Furthermore, a security module may comprise means for cryptographic data protection, for example a random number generator, a generator for cryptographic keys, a hash generator, encryption and decryption module, a signature module, certificates and/or one or more non-migratable cryptographic keys.

In accordance with some exemplary embodiments the security module is configured as what is known as a Tamper Proof Module or Trusted Platform Module (TPM), which are also referred to as a Tamper Resistant Module (TRM). For example, at least parts of the hardware component are signed, for example program components and/or hardware components which may carry a digital signature. Before the hardware component is used, the TRM checks whether the signature or the signatures are valid. If one of the signatures is not valid, the TRM blocks the use of the hardware component. A TPM for example comprises a microcontroller according to the TCG specification as in ISO/IEC 11889, which expands a hardware component by basic security functions.

The security module may be, for example, a protected microcontroller, i.e. a microcontroller with physically limited access possibilities. In addition, the security module may have additional measures against misuse, in particular against unauthorised access to data in the memory of the security module. For example, a security module comprises sensors for monitoring the state of the security module and its environment, so as to be able to identify deviations from normal operation, which deviations may indicate manipulation attempts. Corresponding sensor types for example comprise a clock frequency sensor, a temperature sensor, a voltage sensor and/or a light sensor. Clock frequency sensors, temperature sensors and voltage sensors for example detect deviations in the clock frequency, temperature and/or voltage above or below a predefined normal range. In particular, a security module may comprise a non-volatile memory with a protected memory area.

In accordance with one embodiment of the invention the means for protecting the security module against unauthorised manipulations include mechanical means, which for example are intended to prevent the opening of the security module or parts thereof, or which make the security module useless, for example by initiating a loss of data, if an attempt is made to tamper with the security module. For example, security-critical parts of the security module may for this purpose be cast in epoxy resin, wherein an attempt to remove a relevant component from the epoxy resin leads to an unavoidable destruction of this component.

The trustworthiness of the security module, that is to say it's function as a "trust anchor", is ensured by technical measures by way of the means for protecting against unauthorised manipulations. For example, the security module is configured by a trustworthy institution, for example by a Trust Centre, and is provided with the required cryptographic key material. By way of the means for protecting against unauthorised manipulations, it may be ensured that security-relevant functions of the security module are not modified.

In accordance with some embodiments at least one security module is provided which protects a plurality of hardware components of the hardware system. In accordance with some embodiments the security module checks the signatures of the hardware components comprised by the block chain. In accordance with some embodiments the security module also checks the configuration of an associated hardware component with use of the block chain. For example, the security module checks whether the configuration of the hardware module matches or is compatible with the system configuration logged by the block chain.

In accordance with some embodiments the block chain is stored at least centrally in the memory of one or more hardware components selected for storage of the block chain. Some embodiments may have the advantage that the block chain may be protected against unauthorised access.

In accordance with some embodiments the block chain is stored in a decentralised manner in the memories of all hardware components of the plurality of hardware components. Some embodiments may have the advantage that each of the hardware components has access to the block chain and may check the correctness of the entries.

In accordance with some embodiments the implementation of the requested first change to the system configuration in the hardware system comprises a change to the configuration data of one or more of the hardware components of the plurality of hardware components. Some embodiments may have the advantage that changes to a plurality of hardware components may thus be controlled in parallel, for example.

In accordance with some embodiments the method, in the case that the approval quorum that is necessary for the consensus is not achieved, also comprises: renewed sending of the first change request by the requesting first hardware component. If a consensus regarding acceptance of a change request is not achieved since this change is not compatible with the current configurations of one or more of the hardware components, this may already be different in the event of a renewed request at a later time. If, in the meantime, the configuration of the incompatible hardware components changes, for example as a result of a corresponding software update, such that these are now compatible, the change for a request sent again will now be successful. Some embodiments may have the advantage that temporal changes to the configurations of the hardware components may be taken into consideration.

In accordance with some embodiments the requesting first hardware component re-sends the first change request once a predefined period of time has passed. Some embodiments may have the advantage that they enable a simple and effective control of the repeated sending of the change request. The change request therefore is not lost and may be implemented automatically in the hardware system as soon as the preconditions necessary for this are satisfied.

In accordance with some embodiments the requesting first hardware component re-sends the first change request following a successful second change to the system configuration. Some embodiments may have the advantage that the first change request may be re-submitted as soon as the preconditions necessary for its implementation have been satisfied. These preconditions may be created for example as a result of the successful second change. For example the first change request is associated with a necessary precondition. As soon as a second change is made which satisfies the corresponding necessary precondition, the first change request is re-sent.

In accordance with some embodiments the requesting first hardware component sends the first change request repeatedly until the approval quorum that is necessary for a consensus is achieved. Some embodiments may have the advantage that the first request for change is not lost, but instead is sent until a consensus is present and the requested change may be implemented. For example, the first change request may be associated with an indicator of its importance. In the case of an indicator which indicates a high importance, the first change request is sent repeatedly until the approval quorum that is necessary for a consensus is achieved. In the case of an indicator which indicates a lower importance, the first change request is sent repeatedly until the approval quorum necessary for a consensus or a fixed maximum number of repetitions is reached. The fixed maximum number of repetitions may be dependent for example on the importance associated with the first change request and likewise may decrease with decreasing importance. For example, the identification of the importance indicates the maximum number of repetitions. If the maximum number of repetitions is reached, the first change request is for example not sent again, but instead deleted. This, however, does not rule out the fact that the first change request may be initiated or created again later, with the counting of the repetitions starting again with the re-created first change request. In accordance with some embodiments the re-initiated first change request may be associated with a different importance, in particular a greater importance, than before.

In accordance with some embodiments the requested change to the system configuration of the hardware system comprises an addition, removal and/or change of a service provided by at least one hardware component of the plurality of hardware components. Some embodiments may have the advantage that the hardware system may thus control independently whether a service within the hardware system is added, removed or changed. For example, a new service may be added, such as a new function. Furthermore, an existing service may be removed, for example if this is replaced or will no longer be supported by a new service, for example due to security concerns. In addition, a service may be changed, for example updated and/or made consistent with changes to another service.

In accordance with some embodiments the service is provided by all hardware components of the plurality of hardware components. Some embodiments may have the advantage that for example services used jointly by all hardware components, such as communication protocols and/or cryptographic security protocols, may be managed. Cryptographic security protocols may comprise cryptographic encryption and/or signature algorithms, for example.

In accordance with some embodiments the service comprises a step of providing a software resource and/or a hardware resource. Some embodiments may have the advantage that the management of the services provided by the hardware system or within the hardware system comprises both software resources, such as application programs and/or operating programs, and hardware resources, such as processes, memories, communication interfaces, sensors, input devices, output devices, etc. Both changes to the software configuration of individual and/or all hardware components, as well as hardware modifications, in particular also the addition of additional hardware components and/or the removal of existing hardware components, may thus be handled.

In accordance with some embodiments the first change request is generated and sent by the requesting first hardware component following a configuration change to the requesting first hardware component. Some embodiments may have the advantage that for example a hardware and/or software resource of the first hardware component is changed. The first request or a change is generated and sent in order to be able to provide this changed hardware and/or software resource also to the other hardware components of the hardware system. If the change is successful, the other hardware components of the hardware system may also use the changed hardware and/or software resources of the first hardware component.

In accordance with some embodiments the requesting first hardware component is a hardware component to be integrated in the hardware system, and the requested first change to the system configuration comprises a login of the first hardware component to be integrated and integration thereof into the hardware system. Some embodiments may have the advantage that additional hardware components may thus be integrated into the hardware system, for example similarly to the first hardware component. The additional hardware component logs in to the hardware system by way of a first change request. The login is successful if the approval quorum that is necessary for the consensus is achieved. The first hardware component is thus integrated into the hardware system. In other words, the hardware system or the hardware components of the hardware system are configured as a result of the changes such that they may use the first hardware component or may be used thereby. To this end, the first hardware component is for example registered at the other hardware components. In accordance with some embodiments the registration comprises a detection and/or storage of a list of the service provided by the first hardware component. Here, the list comprises at least one service, which in accordance with some embodiments may be used at the same time as an identifier of the first hardware component or may be provided by the identifier.

In accordance with some embodiments the requesting first hardware component is to be integrated into the hardware system as a replacement for a second hardware component that is to be replaced, and the requested first change to the system configuration comprises a logoff from the hardware system of the second hardware component that is to be replaced. Some embodiments may have the advantage that hardware components of the system thus provided may be replaced efficiently with new hardware components.

In accordance with some embodiments the requesting first hardware component is to be integrated into the hardware system as a replacement for a second hardware component that is to be replaced, wherein the method also comprises:

creating and transmitting a second change request for a third change to the system configuration of the hardware system by means of the second hardware component that is to be replaced, wherein the third change to the system configuration comprises a logoff from hardware system of the second hardware component that is to be replaced, receiving the second change request by means of the further hardware components of the plurality of hardware components, checking the second change request by means of the further hardware components for compatibility of the change request with the configuration of the particular receiving hardware component by using configuration data of the receiving hardware component, in the case that the requested third change to the system configuration is compatible with the configuration of the checking hardware component, generating and transmitting an approval of the third change to the system configuration by means of the corresponding hardware component, and in the case that an approval quorum of the hardware components of the plurality of hardware components that is necessary for a consensus is achieved, entering the requested third change to the system configuration of the hardware system in the block chain, logging off from the hardware system the second hardware component that is to be replaced.

Some embodiments may have the advantage that the second hardware component is not logged off without approval of the further hardware components of the hardware system. Only if an approval quorum of the corresponding hardware components that is necessary for consent is achieved is the second hardware component logged off. A second hardware component that is still required by the further hardware components may thus be prevented from being logged off and removed. This makes it possible to avoid functional disruptions to the hardware system.

In accordance with some embodiments the entering of the requested third change in the block chain is a first necessary precondition for the logoff of the second hardware component which is to be replaced from the hardware system. Some embodiments may have the advantage that a logoff is implemented only on the condition of an approval quorum of the further hardware components of the hardware system that is necessary for a consensus. If there is no consensus present, there is no entry into the block chain and therefore no logoff of the second hardware component. Furthermore, it may thus be ensured that no changes which are not logged in the block chain are made to the configuration of the hardware system.

In accordance with some embodiments the entry of the requested first change in the block chain is a second necessary precondition for the logoff from the hardware system of the second hardware component which is to be replaced. Some embodiments may have the advantage that the second hardware component is not logged off without the first hardware component, which is intended to replace the second hardware component, having been logged on. It may thus be ensured that at least one of the two hardware components, i.e. either the second or the first hardware component, is always logged on during the course of the replacement. The functionality of the hardware system may thus be ensured also during the replacement.

Some embodiments also comprise a hardware system which is associated with a block chain for controlling a system configuration of the hardware system. The block chain comprises entries with configuration data of the hardware system. The hardware system comprises a plurality of hardware components, wherein each of the hardware components comprises at least one processor, a memory with configuration data of the particular hardware component, and a communication interface for communicating with one or more of the hardware components of the hardware system. The memories of the hardware components also comprise in each case program instructions for carrying out a method for controlling the system configuration of the hardware system. An execution of the program instructions by the processors of the hardware components controls the hardware system such that it carries out the method, which comprises:

creating and transmitting a first change request for a first change to the system configuration of the hardware system by means of a first hardware component of the plurality of hardware components, receiving the first change request by means of the further hardware components of the plurality of hardware components, checking the first change request by means of the further hardware components for compatibility of the change request with the configuration of the particular receiving hardware component by using configuration data of the receiving hardware component, in the case that the requested first change to the system configuration is compatible with the configuration of the receiving hardware component, generating and transmitting an approval of the first change to the system configuration by means of the receiving hardware component, and in the case that an approval quorum of the hardware components of the plurality of hardware components that is necessary for a consensus is achieved:

entering the requested first change to the system configuration of the hardware system in the block chain, implementing the requested first change to the system configuration in the hardware system.

In accordance with some embodiments the hardware system is also configured to carry out a method according to one or more of the previously described embodiments.

The use of ordinal numbers, such as "first", "second", "third", etc. is used herein, unless otherwise clear from the specific context, solely in order to distinguish different elements from one another and is not intended to imply a specific order or sequence.

Elements in the following embodiments which correspond to one another will be denoted by like reference signs.

FIG. 1 shows a schematic block diagram of an exemplary hardware system 100. The hardware system 100 comprises a plurality of hardware components 102. The hardware system 100 is associated with a block chain, in which changes to the system configuration of the hardware system 100 are entered. These changes may be, for example, an addition of an additional hardware component 106 or a removal of an existing hardware component 102. The changes may also be, for example, changes of communication protocols, cryptographic protocols, or application or operating programs. The individual hardware components 102 of the hardware system 100 communicate with one another via communication connections 104. These communication connections 104 may be wireless or wired or contact-based or contactless communication connections, for example. In accordance with some embodiments the hardware system 100 thus forms a network, which for example has a meshed and/or fully meshed topology.

If, for example, an additional hardware component 106 is to be added to the hardware system 100, this hardware component 106 sends a change request for a change to the system configuration of the hardware system 100 to the further hardware components 102 in order to integrate the additional hardware component 106 into the system configurations. This may be implemented for example by broadcasting via the communication connections 108. The change request is in this case transmitted from the hardware component 106 to all further hardware components 102 of the hardware system 100.

Furthermore, one of the existing hardware components 102 of the hardware system 100 for example may have been modified and/or may offer a new service. For example, the corresponding hardware component 102 sends a change request for a corresponding change to the system configuration of the hardware system 100 to the further hardware components 102 in order to integrate the changes of the existing hardware components 102 into the system configuration.

The hardware system 100 may be, for example, a peer-to-peer network, in which all hardware components 102, 106 are equal and may both make use of services and provide services. Alternatively, hardware components 102, 106 of the hardware system 100 may also be in a client-server relationship to one another. In this relationship a hardware component 102, 106 functioning as server offers a service, and a hardware component 102, 106 functioning as client uses this service. In the case of a peer-to-peer architecture, each hardware component 102, 106 of the hardware system 100 comprised by the peer-to-peer architecture is a peer, i.e. an equal, and consequently may use and itself offer a service, equally.

Figure 2:
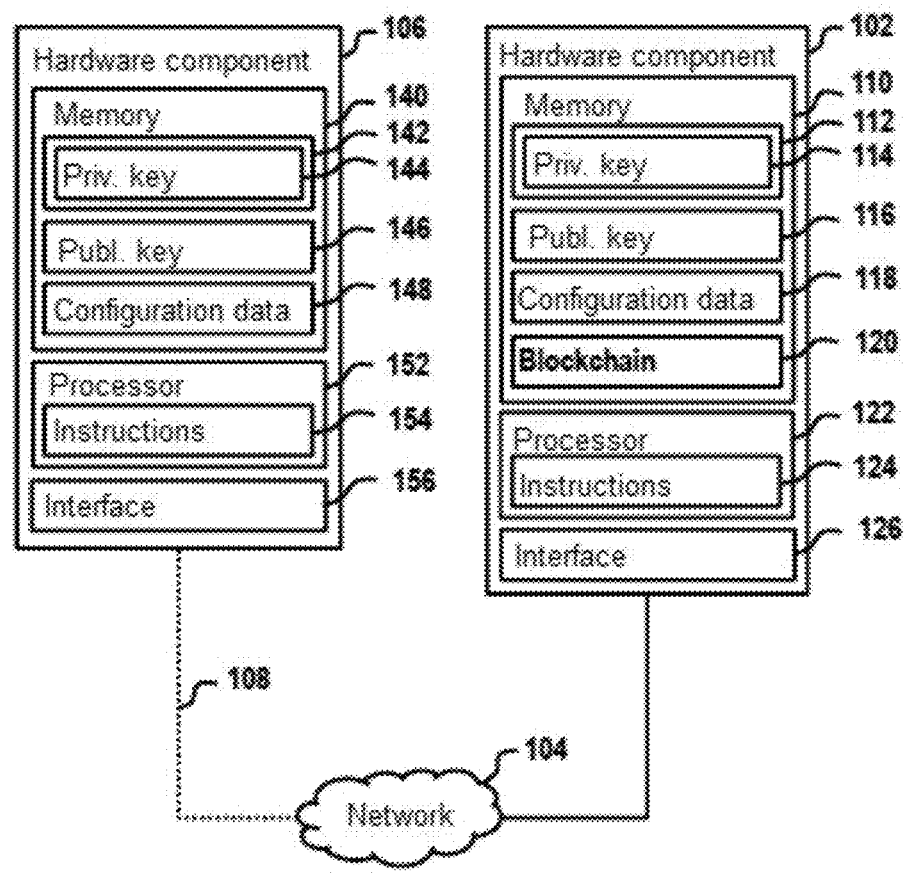
FIG. 2 shows a block diagram of an embodiment of exemplary hardware components.

FIG. 2 shows embodiments of exemplary hardware components 102, 106. The exemplary hardware component 102 of the hardware system 100 comprises a processor 122. The processor 122 is configured to execute program instructions 124 for controlling the system configuration of the hardware system comprised by the hardware component 102. The system configuration is controlled with use of a block chain 120 associated with the hardware system. The block chain 120 is stored in a memory 110 of the hardware component 102. The block chain 120 comprises entries with configuration data of the hardware system 100. Furthermore, configuration data 118 of the hardware component 102 are stored in the memory 110. The configuration data 118 are stored for example in one or more configuration files. In accordance with some embodiments a private key 114 of the hardware component 102 is stored in a protected memory area 112 of the memory 110. The hardware component 102 checks change requests for a change to the system configuration, for example on the basis of the configuration data 118, for compatibility with its configuration. In the event that the requested change to the system configuration according to the configurations data 118 is compatible with the configuration of the hardware component 102, the hardware component 102 generates an approval for the change and signs this for example with the private key 114. In addition, a public cryptographic key 116 associated with the private key 114 may be stored in the memory 110 and may be used to check signatures made by the private key 114. The public key 116 may also be comprised by the further hardware components of the hardware system 100, such that the further hardware components may check signatures of the hardware component 102 with the private key 114. Alternatively or additionally, the block chain 120 may also comprise the public key 116. Any hardware component of the hardware system 100 which comprises the block chain 120 may thus check the validity of signatures made using the private key 114. In accordance with some embodiments the hardware component 102 may also comprise public cryptographic keys of the further hardware components of the hardware system 100. These public cryptographic keys may be stored in the memory 110, for example. In accordance with some embodiments they may be comprised by the block chain 120. In accordance with some embodiments they may be comprised by the block chain 120. A storing of the public cryptographic keys of the hardware components integrated in the hardware system makes it possible for the validity of signatures of all integrated hardware components to be checked with use of the block chain 120.

Lastly, the hardware component 102 comprises a communication interface 126 for communication with the further hardware components of the hardware system 100. In order to increase security, in particular if the system is a security-critical system, the communication with the further hardware components of the hardware system 100 is performed for example with use of an end-to-end encryption. The communication is implemented for example via a network 104. The network 104 may be an internal network of the hardware system 100. In other words, it may be a network which is formed by a combination of the hardware components of the hardware system, i.e. by the hardware system itself, and which enables communication of the individual hardware components with one another. In accordance with further embodiments, the network may be a private network, such as an intranet, or a public network, such as the Internet. In this case the network 104 comprises components or is formed by components which are not part of the hardware system, i.e. their configurations are not logged in the block chain 120. In accordance with some embodiments the network 104 is connected to a further private or public network, for example an intranet or the Internet, or is linked communicatively thereto.

The exemplary hardware component 106 is for example an additional hardware component which is to be added to the hardware system 100. The hardware component 106 comprises a processor 152. The processor 152 is configured to execute program instructions 154 in order to integrate the hardware component 106 into the hardware system 100. The hardware component 106 comprises a memory 140 with configuration data 148. Furthermore, the hardware component 106 in the memory 140 may comprise a public cryptographic key 146 and a protected memory area 142 with a private cryptographic key 144 associated with the public key 146. Lastly, the hardware component 106 comprises a communication interface 156 for communicating with the hardware components of the hardware system 100, for example the hardware component 102.

The execution of the program instructions 154 prompts the processor 152 for example to create a change request and to send it via the network to the hardware components of the hardware system 100, for example a hardware component 102. The change request for example comprises configuration data 148 and/or the public key 146 of the hardware component 106. The hardware component 102 checks the change request, for example in particular the configuration data 148, for its compatibility with the configuration of the hardware component 102, for example with use of its own configuration data 118. If the hardware component 106 is compatible with the hardware component 102, the hardware component 102 generates and sends an approval for the change. The approval is sent for example to a hardware component of the hardware system 100 provided for the integration of additional hardware components.

If an approval quorum of a plurality of hardware components of the hardware system that is necessary for a consensus is achieved, the hardware component provided for integration enters the requested change to the system configuration of the hardware system 100 in the block chain 120. For example, the configuration data 148 of the hardware component 106 are entered in the block chain 120 and/or the public key 146. The change is furthermore implemented, i.e. the hardware component 106 is included in the hardware system 100. To this end, a corresponding message for example is sent to all hardware components of the hardware system 100. The message for example comprises the additional entries in the block chain 120 and/or the configuration data 148 and/or the public key 146. Each of the hardware components of the hardware system 100 which comprises a copy of the block chain 120 may thus update this. For example, each hardware component of the hardware system 100 comprises a copy of the block chain 120. Furthermore, the hardware components of the hardware system 100 may adapt their configurations or configuration data to the additional hardware component 106. This is true in particular for hardware components whose configuration is incompatible with the additional hardware component 106. An adaptation may be implemented for example by way of a software update or an installation of an additional software component. The altered block chain 120 is for example also sent to the additional hardware component. In accordance with some embodiments the hardware component intended for integration forwards the change request of the hardware component 106 to the further hardware components of the hardware system 100. Alternatively, the hardware component provided for integration does not forward the change request of the hardware component 106, but instead creates a second change request with use of the change request of the hardware component 106, which second request is sent to further hardware components of the hardware system 100. The forwarded change request and/or the second change request is for example signed by the hardware component provided for integration using a private cryptographic key associated with said hardware component.

In accordance with some embodiments each of the hardware components of the hardware system 100 comprises a copy of the block chain 120. Furthermore, the approvals of the individual hardware components are sent or forwarded to all hardware components of the hardware system 100. Each of the hardware components may thus independently check whether an approval quorum that is necessary for a consensus has been achieved. If the necessary approval quorum has been achieved, each hardware component may enter the requested change to the system configuration of the hardware system into the corresponding copy of the block chain 120 independently.

A change request may also comprise a hardware and/or software change of a hardware component 102 already integrated into the hardware system 100, such as the hardware component 102. For example, a change of the system configuration of the hardware system 100 is necessary for use of the hardware and/or software change by the hardware component 102 itself and/or by one or more further hardware components of the hardware system 100. A change of the system configuration of the hardware system 100 may for example comprise a hardware and/or software change of individual and/or all components of the hardware system. A corresponding change request is then created for example by the hardware component 102 and is sent to the further hardware components of the hardware system 100. In response to the change request, the hardware component 102 for example receives approvals for the change request from all hardware components whose configurations are compatible with the requested change. On the basis of the obtained approvals, the hardware component 102 may check whether the approval quorum necessary for a consensus has been achieved. If the necessary approval quorum has been achieved, the hardware component 102 enters the change into the copy of the block chain 120. Furthermore, the hardware components of the hardware system 100 may change or adapt their configuration data such that the requested change is implemented in the hardware system. This may comprise a change or adaptation of the configuration data so that the corresponding hardware components are configured to use the hardware and/or software change of the requesting hardware component 102 or enable the hardware component 102 to use the corresponding hardware and/or software change. This enablement may for example comprise a provisioning of specific data and/or an execution of specific functions.

Figure 3:
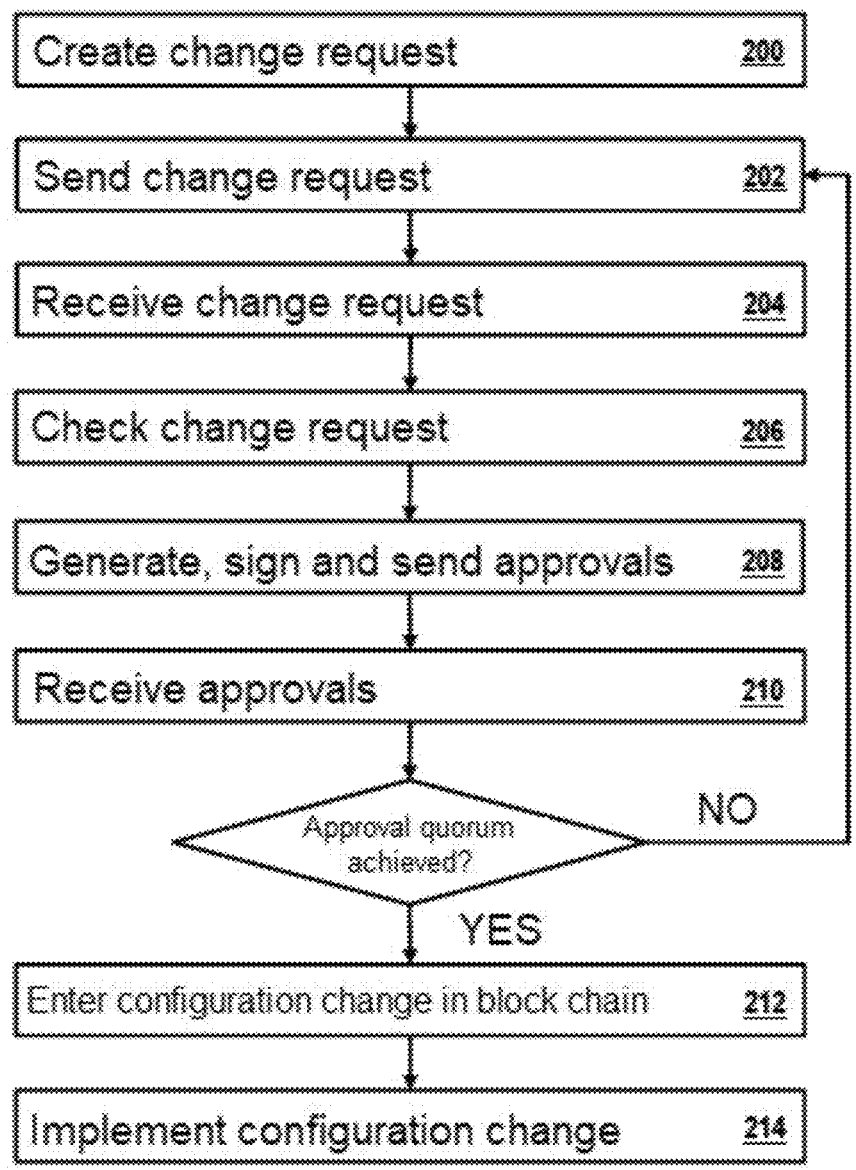
FIG. 3 shows a flow diagram of an embodiment of a first exemplary method for controlling the hardware system of FIG. 1.

FIG. 3 shows an exemplary method for controlling a system configuration of the hardware system of FIG. 1 with use of a block chain associated with the hardware system. In step 200 a change request for a first change to the system configuration of the hardware system is created by a first hardware component. In step 202 the first hardware component sends the change request to the further hardware components of the hardware system, which receives the change request in step 204. In step 206 the further hardware components check the change request for its compatibility with the configuration of the particular receiving hardware component. To this end, the receiving hardware components use their configuration data, for example. In the event that the requested change of the system configuration is compatible with the configuration of the relevant receiving hardware component, the corresponding hardware component in step 208 generates an approval for the change to the system configuration, signs this approval, and sends the signed approval to the requesting hardware component. In step 210 the requesting hardware component receives the approvals of all approving hardware components of the hardware system. In the event that an approval quorum of the hardware components of the hardware system that is necessary for a consensus is achieved, the method is continued in step 212, and the requested configuration change is entered in the block chain. In step 204, the requested configuration change is implemented in the hardware system. The steps 212 and 214 may be executed for example at the same time. The implementation of the requested configuration change for example comprises an adaptation of the configuration data of the hardware components to the change of the system configuration of the hardware system. In accordance with further embodiments step 212 may be executed before step 214, or step 214 may be executed before step 212, for example.

In the event that an approval quorum of the hardware components of the hardware system that is necessary for a consensus is not achieved, the method is continued in step 202 and the change request is sent again when a predefined criterion is satisfied. The predefined criterion may comprise, for example, the expiry of a predefined period of time or the occurrence of a predefined event. The predefined event may be, for example, the implementation of a further change to the system configuration, in particular configuration changes of one or more of the hardware components.

In accordance with some embodiments each of the hardware components of the hardware system comprises a copy of the block chain. In this case, in step 208 the approvals are sent not only to the requesting hardware component, but to all voting hardware components to whom the change request was also sent in step 202. In step 210, not only does the requesting hardware component thus receive the approvals, but each of the hardware components receives all other approvals that were sent in step 208. With use of the received approvals, each hardware component may independently check whether an approval quorum necessary for a consensus has been achieved. If the check reveals that the necessary approval quorum has been achieved, the configuration change in step 212 is entered in the copy of the block chain comprising the relevant checking hardware component. The implementation of the configuration change in step 204 in this case for example comprises the independent adaptation of the configuration data of the relevant checking hardware component in accordance with the specifications of the change to the system configuration of the hardware system.

Figure 4:
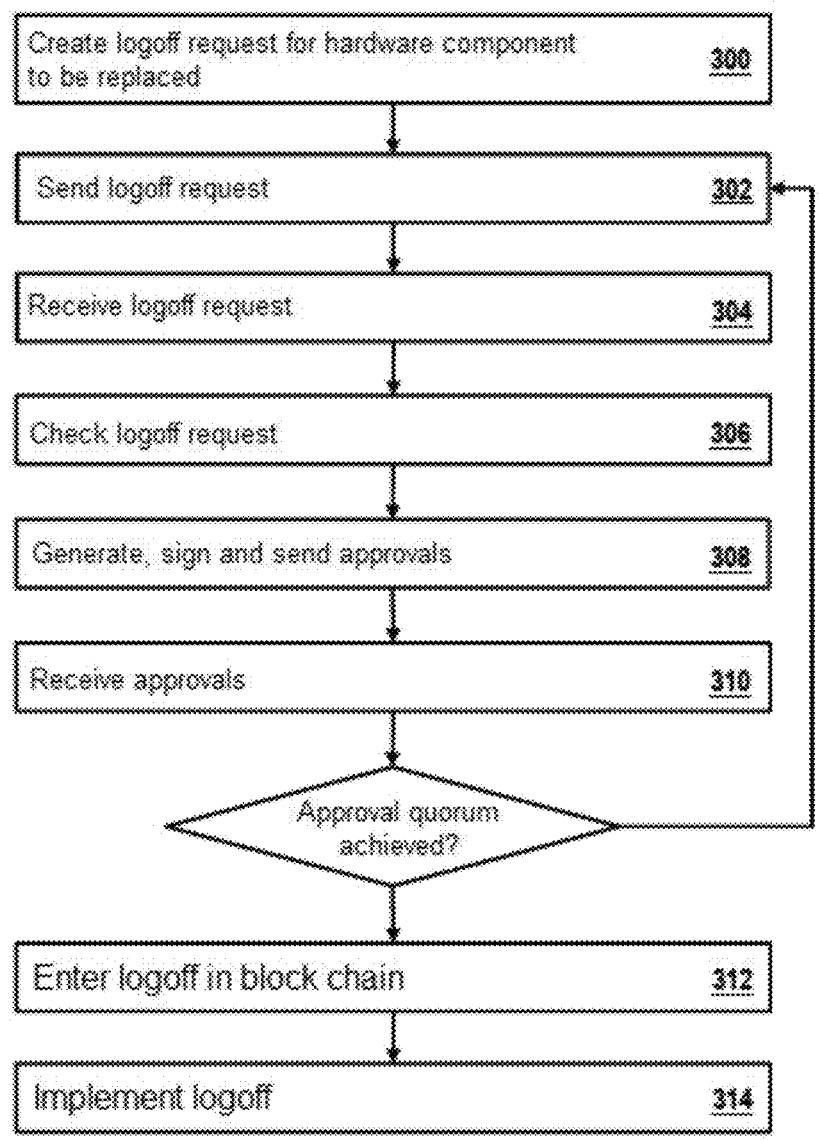
FIG. 4 shows a flow diagram of an embodiment of a second exemplary method for controlling the hardware system of FIG. 1.

FIG. 4 shows an exemplary method for logging off a hardware component from a hardware system, as shown for example in FIG. 1, with use of a block chain associated with the hardware system. In step 300 a logoff request for logging off a hardware component of the hardware system that is to be replaced or removed without replacement is created. In step 302 the hardware component to be logged off sends the logoff request to the further hardware components of the hardware system, which receive the logoff request in step 304. In step 306 the further hardware components check the logoff request for its compatibility with the configuration of the relevant receiving hardware component. To this end, the receiving hardware components for example use their configuration data. In the event that the requested logoff is compatible with the configuration of the relevant receiving hardware component, the corresponding hardware component in step 308 generates an approval for the logoff, signs this approval, and sends the signed approval to the requesting hardware component. The logoff is compatible with the configuration of a hardware component for example if the functioning of the corresponding hardware component is not reliant on the hardware component to be logged off. In particular, this may be the case if the corresponding hardware component does not access the hardware component to be logged off or if such access is not essential for maintaining the functionality of the corresponding hardware component. This may also be the case if the hardware system comprises a replacement for the hardware component to be logged off. In step 310 the hardware component to be logged off receives the approvals of all approving hardware components of the hardware system. In the event that an approval quorum of the hardware components of the hardware system that is necessary for a consensus is achieved, the method is continued in step 312, and the logoff of the requesting hardware component is entered in the block chain. In step 314 the requesting hardware component is logged off from the hardware system. Steps 312 and 314 for example may be performed at the same time. The logoff for example comprises an adaptation of the configuration data of the hardware components to the change to the system configuration of the hardware system. For example, the configurations of one or more of the hardware components are adapted such that they access a replacement for the logged-off hardware component or corresponding access is blocked if not essential for maintaining the functionality of the corresponding hardware components. Following the logoff, the logged-off hardware component may be removed, without compromising the functionality of the remaining hardware system. Rather, it may thus be ensured that the hardware system remains functional. In accordance with further embodiments step 312 may be carried out before step 314, or step 314 may be carried out before step 312, for example.

In the event that an approval quorum of the hardware components of the hardware system that is necessary for a consensus is not achieved, there is initially no logoff of the hardware component to be logged off. Rather, the hardware component to be logged off remains part of the hardware system and continues to communicate with other hardware components of the system. The method is continued in step 302, and the logoff request is sent again when a predefined criterion is satisfied. The predefined criterion may for example comprise the expiry of a predefined period of time or the occurrence of a predefined event. The predefined event, for example, may be the implementation of a change to the system configuration, in particular configuration changes of one or more of the hardware components. Furthermore, the predefined events may be, for example, a successful edition of an exchange component. If the exchange component was added successfully to the hardware system in accordance with the method according to FIG. 3, the hardware components of the system now access the added hardware component instead of the hardware component to be logged off. Consequently, the hardware component to be logged off may be removed following addition of the exchange component, without the functionality of the remaining hardware system being compromised.

In accordance with some embodiments each of the hardware components of the hardware system comprises a copy of the block chain. Furthermore, in this case, the approvals in step 308 are sent not only to the requesting hardware component, but all voting hardware components to whom the change request was also sent in step 302. In step 310, not only does the requesting hardware component receive the approvals, but each of the hardware components also receives all other approvals that were sent in step 308. With use of the received approvals, each hardware component may independently check whether an approval quorum necessary for a consensus has been achieved. If the check reveals that the necessary approval quorum has been achieved, the logoff in step 312 is entered in the copy of the block chain comprising the particular checking hardware component. The implementation of the configuration change in step 314 in this case comprises for example the independent adaptation of the configuration data of the particular checking hardware component, such that the hardware component to be logged off may be safely removed. For example, access to the hardware component to be logged off is blocked and/or replaced by access to one or more other hardware components.

LIST OF REFERENCE SIGNS

100 hardware system
102 hardware component 104 network
106 hardware component
108 communication connection
110 memory
112 protected memory area
114 private cryptographic key
116 public cryptographic key
118 configuration data
120 block chain
122 processor
124 program instructions
126 communication interface
140 memory
142 protected memory area
144 private cryptographic key
146 public cryptographic key
148 configuration data
152 processor
154 program instructions
156 communication interface

The invention claimed is:

1. A method for controlling a system configuration of a hardware system by using a block chain associated with the hardware system, wherein the block chain comprises entries with configuration data of the hardware system, wherein the hardware system comprises a plurality of hardware components including a first hardware component and at least more than one receiving hardware components, wherein each of the plurality of hardware components comprises at least one processor, a memory with configuration data for a particular hardware component, and a communication interface for communicating with one or more of the plurality of hardware components of the hardware system,
wherein the method comprises:
creating and sending a first change request for a first change to the system configuration of the hardware system by the first hardware component of the plurality of hardware components,
receiving the first change request by the receiving hardware components of the plurality of hardware components,
checking the first change request by at least one of the receiving hardware components for compatibility of the first change request with the configuration data of the receiving hardware component by using the configuration data of the receiving hardware component,
in the case that the requested first change to the system configuration is compatible with the configuration data of the receiving hardware component, generating and sending an approval of the first change to the system configuration by the receiving hardware component, and
in the case that an approval quorum of at least one of the hardware components of the plurality of hardware components that is necessary for consent is achieved,
entering the requested first change to the system configuration of the hardware system into the block chain, and
implementing the requested first change to the system configuration in the hardware system.

2. The method according to claim 1, wherein the approval quorum that is necessary for a consensus requires that a number of approvals of the hardware components of the plurality of hardware components exceeds a threshold value.

3. The method according to claim 2, wherein the threshold value is dependent on a type of the first change request to the system configuration.

4. The method according to claim 1, wherein the plurality of the hardware components are associated with weighting factors and a number of approvals of the hardware components is determined as weighted sum under consideration of the weighting factors of approving hardware components of the receiving hardware components that sent an approval of the first change.

5. The method according to claim 1, wherein the plurality of hardware components comprise at least one hardware component whose approval is obligatory for the entering of the requested first change to the system configuration of the hardware system in the block chain, and wherein the approval quorum that is necessary for a consensus requires an approval of the at least one obligatory hardware component.

6. The method according to claim 5, wherein the approval quorum that is necessary for a consensus requires an approval of all hardware components of the plurality of hardware components.

7. The method according to claim 1, wherein the memories of the plurality of hardware components each comprise a protected memory area, in which a private cryptographic key of an asymmetric key pair associated with the particular hardware component is stored, wherein the method also comprises: signing a plurality of individual approvals by a particular generating hardware component of the plurality of hardware components with use of the private cryptographic key stored in the protected memory area of the particular generating hardware component.

8. The method according to claim 1, wherein the entering of the requested first change in the block chain is a necessary precondition for the implementation of the requested first change to the system configuration in the hardware system.

9. The method according to claim 1, wherein the first change to the system configuration is entered in the block chain by the first hardware component.

10. The method according to claim 1, wherein the requested first change to the system configuration is entered in the block chain by a hardware component of the plurality of hardware components selected for entering changes to the system configuration in the block chain.

11. The method according to claim 1, wherein the block chain is stored at least centrally in the memory of one or more hardware components of the plurality of hardware components selected for storage of the block chain.

12. The method according to claim 11, wherein the block chain is stored in a decentralised manner in the memory of each of all hardware components of the plurality of hardware components.

13. The method according to claim 1, wherein the implementation of the requested first change to the system configuration in the hardware system comprises a change to the configuration data of one or more of the hardware components of the plurality of hardware components.

14. The method according to claim 1, wherein the method, in an event that the approval quorum that is necessary for the consensus is not achieved, also comprises:
re-sending the first change request by the requesting first hardware component.

15. The method according to claim 14, wherein the requesting first hardware component re-sends the first change request once a predefined period of time has passed.

16. The method according to claim 14, wherein the requesting first hardware component re-sends the first change request following a successful second change to the system configuration.

17. The method according to claim 14, wherein the requesting first hardware component sends the change request repeatedly until the approval quorum that is necessary for a consensus is achieved.

18. The method according to claim 1, wherein the requested change to the system configuration of the hardware system comprises an addition, removal and/or change of a service provided by at least one hardware component of the plurality of hardware components.

19. The method according to claim 18, wherein the service is provided by all hardware components of the plurality of hardware components.

20. The method according to claim 18, wherein the service comprises providing a software resource and/or a hardware resource.

21. The method according to claim 18, wherein the first change request is generated and sent by the requesting first hardware component following a configuration change to the requesting first hardware component.

22. The method according to claim 18, wherein the requesting first hardware component is a hardware component to be integrated in the hardware system and the requested first change to the system configuration comprises a logon of the first hardware component to be integrated as well as integration thereof into the hardware system.

23. The method according to claim 18, wherein the requesting first hardware component is to be integrated into the hardware system as replacement for a second hardware component that is to be replaced, and the requested first change to the system configuration comprises a logoff from the hardware system of the second hardware component that is to be replaced.

24. The method according to claim 23, wherein the requesting first hardware component is to be integrated into the hardware system as a replacement for a second hardware component that is to be replaced, wherein the method also comprises:
   creating and transmitting a second change request for a third change to the system configuration of the hardware system by the second hardware component that is to be replaced, wherein the third change to the system configuration comprises a logoff from hardware system of the second hardware component that is to be replaced,
   receiving the second change request by the receiving hardware components of the plurality of hardware components,
   checking the second change request by at least one of the receiving hardware components for compatibility of the change request with the configuration of the receiving hardware component by using the configuration data of the receiving hardware component,
   in the case that the requested third change to the system configuration is compatible with the configuration of the receiving hardware component, generating and transmitting an approval of the third change to the system configuration by a corresponding hardware component, and
   in the case that a second approval quorum of the hardware components of the plurality of hardware components that is necessary for a consensus is achieved, entering the requested third change to the system configuration of the hardware system into the block chain,
   logging off the second hardware component that is to be replaced from the hardware system.

25. The method according to claim 24, wherein the entering of the requested third change in the block chain is a first necessary precondition for the logoff from the hardware system of the second hardware component that is to be replaced.

26. The method according to claim 24, wherein the entering of the requested first change in the block chain is a second necessary precondition for the logoff from the hardware system of the second hardware component that is to be replaced.

27. A hardware system which is associated with a block chain for controlling a system configuration of the hardware system, wherein the block chain comprises entries with configuration data of the hardware system, wherein the hardware system comprises:
   a plurality of hardware components including a first hardware component and at least more than one receiving hardware components, wherein each of the hardware components comprises
      at least one processor, a memory with configuration data of a particular hardware component and a communication interface for communicating with one or more of the plurality of hardware components of the hardware system,
   wherein the memory of each of the hardware components also comprise program instructions for executing a method for controlling the system configuration of the hardware system, wherein an execution of the program instructions by the processors of the hardware components controls the hardware system to perform the follow,
      creating and sending a first change request for a first change to the system configuration of the hardware system by the first hardware component of the plurality of hardware components,
      receiving the first change request by the receiving hardware components of the plurality of hardware components,
      checking the first change request by at least one of the receiving hardware components for compatibility of the first change request with the configuration data of the receiving hardware component by using the configuration data of the receiving hardware component,
      in the case that the requested first change to the system configuration is compatible with the configuration data of the receiving hardware component, generating and sending an approval of the first change to the system configuration by the receiving hardware component, and
      in the case that an approval quorum of at least one of the hardware components of the plurality of hardware components that is necessary for consent is achieved
         entering the requested first change to the system configuration of the hardware system into the block chain, and
         implementing the requested first change to the system configuration in the hardware system.

* * * * *